US010252472B2

(12) United States Patent
Stefanziosa et al.

(10) Patent No.: US 10,252,472 B2
(45) Date of Patent: Apr. 9, 2019

(54) METHOD FOR JOINING FIBER-REINFORCED PLASTIC MATERIAL

(71) Applicant: Bayerische Motoren Werke Aktiengesellschaft, Munich (DE)

(72) Inventors: Clemens Stefanziosa, Munich (DE); Oguzhan Eroglu, Biberach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 298 days.

(21) Appl. No.: 15/187,008

(22) Filed: Jun. 20, 2016

(65) Prior Publication Data
US 2016/0297140 A1 Oct. 13, 2016

Related U.S. Application Data

(63) Continuation of application No. PCT/EP2015/050468, filed on Jan. 13, 2015.

(30) Foreign Application Priority Data

Jan. 24, 2014 (DE) .................. 10 2014 201 296

(51) Int. Cl.
*B32B 37/00* (2006.01)
*B29C 65/00* (2006.01)
(Continued)

(52) U.S. Cl.
CPC ............ *B29C 66/721* (2013.01); *B29C 65/08* (2013.01); *B29C 65/488* (2013.01);
(Continued)

(58) Field of Classification Search
CPC . B29C 65/08; B29C 65/4815; B29C 65/4875; B29C 65/488; B29C 65/564;
(Continued)

(56) References Cited

U.S. PATENT DOCUMENTS 3,562,041 A 2/1971 Robertson
3,765,973 A 10/1973 Kramer
(Continued)

FOREIGN PATENT DOCUMENTS

AT 334 616 B 1/1976
CN 1364997 A 8/2002
(Continued)

OTHER PUBLICATIONS

Chinese-language Office Action issued in counterpart Chinese Application No. 201580002670.X dated Feb. 8, 2017 with English translation (twelve (12) pages).
(Continued)

*Primary Examiner* — James D Sells
(74) *Attorney, Agent, or Firm* — Crowell & Moring LLP

(57) ABSTRACT

A method is provided for joining a fiber-reinforced joining element, formed from a plastic material, to the joining surfaces thereof by way of an ultrasonic welding method. A concentrator and/or at least one insertion element is arranged in the region of the joining surfaces prior to fusing between the joining surfaces, and the concentrator and/or the insertion element are fused together with the joining surfaces in order to form a positive fit joint therewith after hardening.

8 Claims, 2 Drawing Sheets

(51) Int. Cl.
  *B29C 65/08* (2006.01)
  *B29C 65/48* (2006.01)
  *B29C 65/56* (2006.01)
  *B29C 65/72* (2006.01)
(52) U.S. Cl.
  CPC ...... *B29C 65/4815* (2013.01); *B29C 65/4875* (2013.01); *B29C 65/564* (2013.01); *B29C 65/72* (2013.01); *B29C 66/1122* (2013.01); *B29C 66/30341* (2013.01); *B29C 66/341* (2013.01); *B29C 66/45* (2013.01); *B29C 66/7212* (2013.01); *B29C 66/72141* (2013.01); *B29C 66/73921* (2013.01); *B29C 66/8322* (2013.01); *B29C 65/486* (2013.01); *B29C 66/3024* (2013.01); *B29C 66/71* (2013.01); *B29C 66/73116* (2013.01)
(58) Field of Classification Search
  CPC ................ B29C 65/72; B29C 66/1122; B29C 66/30341; B29C 66/341; B29C 66/45; B29C 66/7212; B29C 66/72141; B29C 66/73921; B29C 66/8322
  USPC ....................................................... 156/73.1
  See application file for complete search history.

(56) References Cited

U.S. PATENT DOCUMENTS

| 4,326,902 | A | 4/1982 | Peddie |
| 2002/0088526 | A1 | 6/2002 | Lee |
| 2003/0219602 | A1 | 11/2003 | Kagan |
| 2004/0157023 | A1 | 8/2004 | Magalhaes et al. |
| 2005/0104389 | A1 | 5/2005 | Vadot et al. |
| 2013/0146209 | A1 | 6/2013 | Dornbusch et al. |
| 2013/0149501 | A1 | 6/2013 | Pacchione et al. |
| 2015/0041070 | A1* | 2/2015 | Wang .................. B29C 65/4815 156/580 |

FOREIGN PATENT DOCUMENTS

| CN | 1561358 A | 1/2005 |
| DE | 1 804 988 A1 | 7/1969 |
| DE | 79 17 860 U1 | 1/1980 |
| DE | 29 44 080 A1 | 5/1980 |
| DE | 60 2004 002 051 T2 | 3/2007 |
| DE | 10 2010 038 470 A1 | 2/2012 |
| EP | 0 261 850 A2 | 3/1988 |

OTHER PUBLICATIONS

International Search Report (PCT/ISA/210) issued in PCT Application No. PCT/EP2015/050468 dated Mar. 31, 2015 with English translation (eight pages).
German-language Written Opinion (PCT/ISA/237) issued in PCT Application No. PCTIEP2015/050468 dated Mar. 31, 2015 (six pages).
German Search Report issued in counterpart German Application No. 10 2014 201 296.1 dated Mar. 18, 2015 with partial English translation (10 pages).

* cited by examiner

METHOD FOR JOINING FIBER-REINFORCED PLASTIC MATERIAL

CROSS REFERENCE TO RELATED APPLICATIONS

This application is a continuation of PCT International Application No. PCT/EP2015/050468, filed Jan. 13, 2015, which claims priority under 35 U.S.C. § 119 from German Patent Application No. 10 2014 201 296.1, filed Jan. 24, 2014, the entire disclosures of which are herein expressly incorporated by reference.

BACKGROUND AND SUMMARY OF THE INVENTION

The present invention relates to a method for joining fiber-reinforced plastics materials. The present invention therefore relates to a method for joining, in particular for welding, fiber-reinforced joining partners, formed from a plastics material, at the connection faces thereof by use of an ultrasonic welding method, wherein for increasing the strength of the connection a concentrator and/or an insert are/is embedded into the joint.

On account of the ongoing development of plastics materials and on account of the clean and simple handling of these materials, connecting thermoplastic base materials by means of ultrasonic welding has rapidly established itself. The "unreleasable" connection produced by means of ultrasonic welding may be applied in the most varied technical fields and with the most varied plastics materials.

In the case of ultrasonic welding using a simultaneously applied force, the induced oscillations by way of boundary surface friction and sound absorption are converted to melting heat. The joint material congeals within the welding zone of the two joining parts and post cooling forms an almost homogenous connection. The strength of the seam may be influenced in particular by way of modifying the profile of the amplitude and/or of the force.

Various devices and methods for welding using ultrasound are known in the prior art. In particular, a device for ultrasonic welding of thermoplastic materials is known from DE 1804988 B, wherein a sonotrode having an elongated apex and a mating face are pressed together and are disposed in relation to one another, wherein the device may find an application in the case of various types of materials, such as sheet material of various thickness, having even relatively large dimensions. Using such a device, in particular woven fabrics which are produced from thermoplastic fibers or at least contain thermoplastic fibers in conjunction with natural fibers, for example a blend of polyester fibers or cotton, may also be interconnected.

A further method for producing a materially-integral connection between workpieces is known from DE 10 2010 038 470. This method has the following steps: providing a workpiece having a metal surface, which on at least one fusing face has a coating containing thermoplastics; providing a workpiece having a thermoplastic surface; placing together the fusing surface and the workpiece having the thermoplastic surface; welding together the workpiece having the metal surface and the workpiece having the thermoplastic surface on the fusing face by ultrasonic action.

An ultrasonic device for welding metal foils, in particular aluminum foils, which are coated with plastics material, which device has a sonotrode excited by means of an emitter and an amplifier, such as are usually found in conventional ultrasonic welding apparatuses, and a support block on which the foils to be welded are placed, is known from DE 2944080 A.

Furthermore, a method for welding thermoplastic materials by means of ultrasound, wherein a thin thermoplastic layer has at least one hole and wherein welding is performed exclusively in the region of the hole, is known from DE 60204002051 T2.

A method for connecting in a tight manner a container from a thermoplastic plastics material by means of ultrasound is known from AT 0334616 B, wherein the materials for producing liquid-tight casings are welded in an overlap.

However, the methods known in the prior art have various disadvantages. On the one hand, the problems lie therein that an unsatisfactory welding procedure is achieved when plastics materials having dissimilar melting points are welded.

A highly significant aspect when welding plastics materials lies in the strength of the connection point. In particular, when fiber-reinforced plastics materials are used, there is a requirement for the weld or the joint, respectively, to have sufficiently high strength and stability.

However, it is known in the case of welding fiber-reinforced plastics material that upon softening and heating the plastics materials, the endless fibers located in the fiber-reinforced plastics material on the boundary surfaces do not protrude into the joint and consequently do not contribute toward the strength of the connection. Thus, despite the use of the fiber-composite materials, the strength properties at the connection point are significantly lower in comparison with the strength of the fiber-composite material.

This means that the connection point per se is present without particle reinforcement or fiber reinforcement.

It is therefore an object of the present invention to overcome such disadvantages and to provide an improved method for joining or welding, respectively, fiber-reinforced joining partners, formed from a plastics material, in which method the joint has improved strength.

This and other objects are achieved by a method for joining fiber-reinforced joining partners, formed from a plastics material, at the connection faces thereof, wherein in the region of the connection faces a concentrator and/or an insert is applied therebetween and, by an ultrasonic welding method, is fused collectively with the connection faces in such a manner that post curing a materially integral joint as a mixing region is configured from the materials of the joining partners and of the concentrator and/or the insert.

The concept of the present invention lies in embedding a separate concentrator and/or insert into the joint of the fiber-reinforced joining partners, formed from a plastics material, so as to achieve a form-fitting and/or materially integral connection point.

A first aspect of the invention lies in embedding a concentrator, for example in the form of granulate, into the joint, so as to, on account of fusing of the granulate, create a mixing region which is configured according to the intended use.

Instead of a concentrator, a second aspect of the invention lies in using an insert having a higher melting temperature than that of the joining partners, so that the insert upon fusing of the connection faces is embedded in the latter in a form-fitting manner.

Therefore, according to the invention a method for joining fiber-reinforced joining partners, formed from a plastics material, at the connection faces thereof, is provided, wherein in the region of the connection faces a concentrator is applied therebetween and by means of an ultrasonic welding method is fused collectively with the connection faces in such a manner that post curing a materially integral joint as a mixing region is configured from the materials of the joining partners and of the concentrator.

Alternatively, furthermore a method for joining fiber-reinforced joining partners, formed from a plastics material, at the connection faces thereof, is provided, wherein in the region of the connection faces an insert is applied therebetween and by means of an ultrasonic welding method the connection faces are fused in such a manner that the insert is embedded in an materially-integral manner into the connection faces and in this way a form-fitting joint is obtained. This is preferably performed in that the melting temperature of the insert is above the melting temperature of the joining partners. On account thereof, the connection faces of the joining partners are fused and the insert may be embedded thereinto in a form-fitting manner.

Thus, an additional thermoplastic material in the form of a concentrator and/or of an insert may thus be applied prior to the actual welding process between the joining partners, where said insert according to the intended use is required for increasing strength. According to the invention, the position, the amount, and the material properties of the concentrator or of the insert here are adaptable to the process, depending on the joining task.

Potential concentrator matrix materials are to have a similar melting range and thus a similar melting temperature as the joining partners, so that a sufficiently stable connection may be produced. Preferably, two plastics materials of identical type are welded together; however, a fiber-reinforced plastics component from PA6 may also be joined using a concentrator from PA6.6 or PA12, for example.

According to the invention, an ultrasonic converter and a sonotrode are disposed in such a manner so that the two joining partners by way of mechanical oscillations are fused at the connection faces thereof and a welded connection is produced.

It is furthermore preferable for the joining partners to be composed of a thermoplastic plastics material into which a plurality of endless fibers are embedded. In this way, thermoplastic plastics materials which are reinforced with endless fibers may be selectively connected to suitable concentrators such that joints with high strength are obtained.

It is therefore particularly preferable for the concentrator used to have a fiber-reinforced or particle-reinforced plastics material. It may be ensured in this way that, upon fusing of the concentrator, fiber-reinforcement may also be achieved in the boundary surfaces and thus in the joint. Carbon fibers, carbon-based fibers, or glass fibers or carbon particles, carbon-based particles, or glass-fiber particles, or the like, may be used as a reinforcement fiber or as reinforcement particles.

In one further preferred embodiment of the invention it is provided that one or a plurality of inserts of a correspondingly adapted shape, size, and/or a selected material composition is/are embedded into the joint. In this way, even complex joining processes may be produced by a suitable selection of inserts. By way of using dissimilar materials, there is furthermore the potential for placing inserts beside one another and for the technical advantages which are offered in each case by the material of the insert to be utilized in one joint.

In one particularly preferred embodiment of the invention, it is established by way of the suitable use of concentrators and/or inserts that the joint post curing comprises in each case one upper and lower boundary surface having an interdisposed transition region, wherein a multiplicity of reinforcement fibers or elements of the insert protrude from the transition region through in each case at least one of the boundary surfaces into the respective adjacent material regions of the joining partners and thus contribute toward the strength of the connection. By way of such an ultrasonic welding connection which is produced by way of a fiber-reinforced concentrator or insert, a joint which has significantly higher strength in comparison to a joint of comparable size produced according to the prior art is obtained.

In one preferred embodiment of the invention, the concentrator is provided as granulate material. In such a case, fusing the granulate between the joining partners is performed collectively with fusing the joint faces.

Various materials are suitable as inserts. For example, a CFRTP may be employed, for example, as embedding material, or alternatively a metallic insert such as a fine-blanked component. A carbon fiber-reinforced thermoplastic insert which is embedded directly between the contact faces of the joining partners and which by the mechanical oscillations is fused together with the joining partners and post curing becomes part of the weld connection may be used as a CFRTP, for example.

A further aspect of the present invention may be seen in that such plastics materials may be used in each case as a concentrator material or as an insert material that the particular technical properties of these materials are employed.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
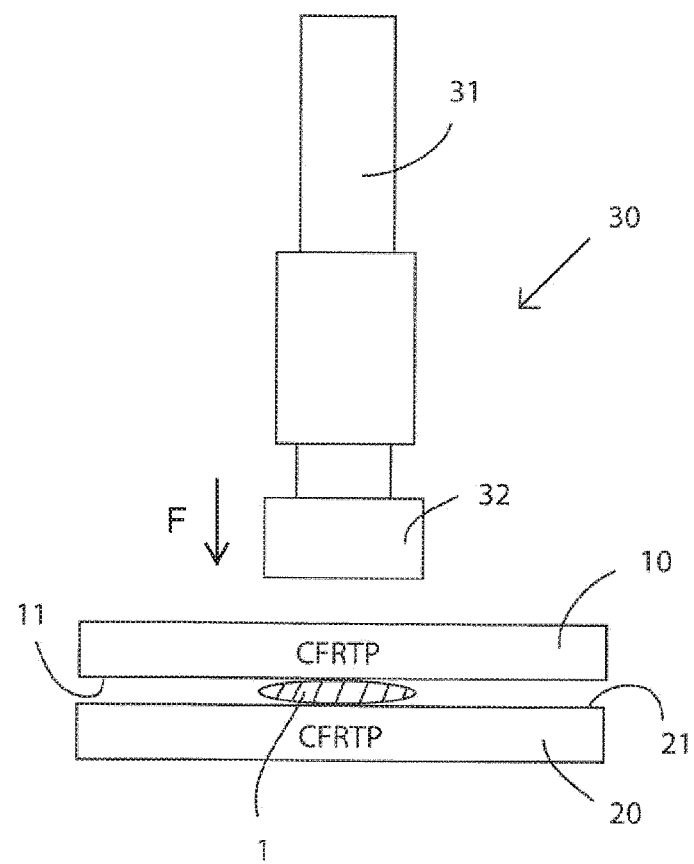
FIG. 1 is a schematic view of an ultrasonic welding device in which a concentrator in the form of fiber-reinforced or particle-reinforced thermoplastic granulate is used.

The method will be explained hereunder with reference to FIGS. 1 to 3, wherein the same reference signs indicate functionally and structurally identical elements.

The method is carried out by use of an ultrasonic welding method, using an ultrasonic welding device 30. The ultrasonic welding device 30 has a conventional ultrasonic converter 31 and a sonotrode 32 which, by means of a force F, may be pressed onto the joining partners. By way of the ultrasonic welding device 30, ultrasonic oscillations may be obtained on the boundary surfaces of the two joining partners 10, 20. When ultrasonic oscillations are created, the connection faces 11, 21 of the joining partners 10, 20 are continuously fused. Prior to the planar joining faces being converged and up to the complete linking of the two joining partners 10, 20, a concentrator 1 was introduced between the joining partners 10, 20, specifically between the connection faces 11, 21 of the latter, as is shown in FIG. 1.

Figure 2:
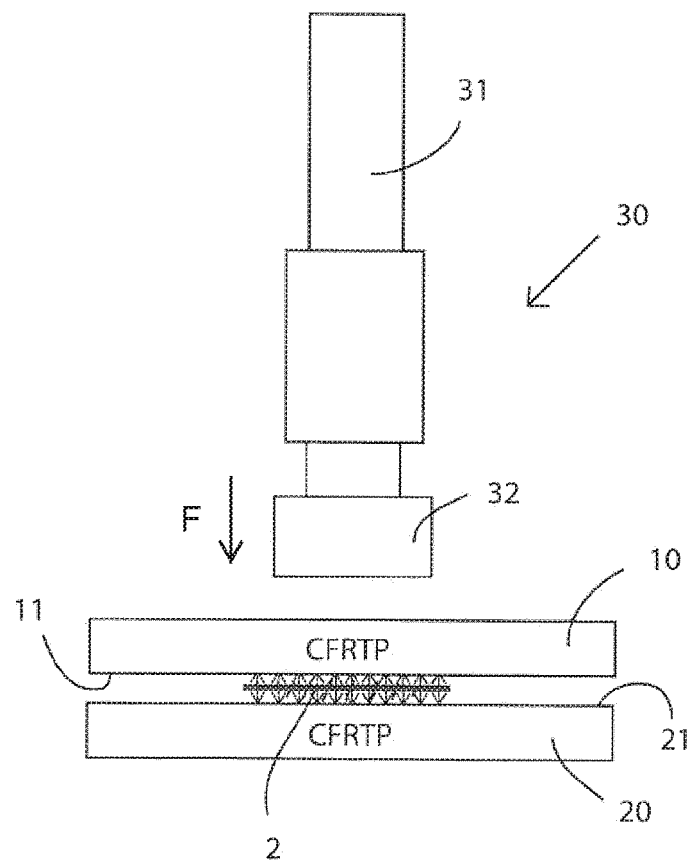
FIG. 2 is a schematic view, similar to FIG. 1, of an ultrasonic welding device in which, instead of the concentrator, a dimensionally stable insert having a higher melting temperature than that of the joining partners is embedded into the joint.
Figure 3:
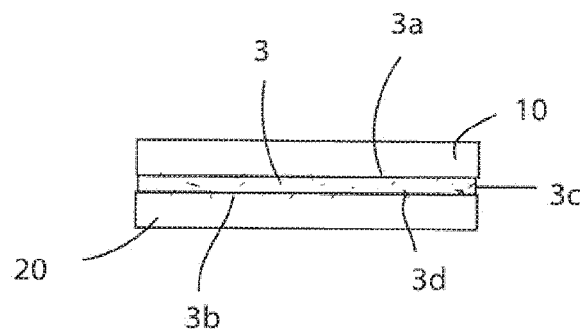
FIG. 3 is a schematic sectional view through a joint between two joining partners that has been produced by the method according to the invention.

Alternatively thereto, in the method illustrated in FIG. 2 a carbon fiber-reinforced thermoplastic insert 2 is embedded into the joint. This insert 2 has a melting temperature which is above the melting temperature of the joining partners such that the insert, upon fusing of the joining partners by means of ultrasound, remains dimensionally stable and is thus embedded in a form-fitting manner into the joint.

It is furthermore provided that as a result of a stationary fusing behavior, a molten layer thickness is configured which is constant or is configured according to the intended use, respectively, and which may be influenced by way of the amplitudes of the sonotrode or else by way of the force profile. Upon configuration of a sufficiently thick molten layer thickness, the impingement with ultrasound is stopped and the weld zone solidifies such that a form-fitting joint 3, which has in each case one upper and lower boundary surface 3a, 3b, is configured. The fused region which is defined by the fused molten layer thickness therebetween configures a transition region 3c, as is schematically shown in FIG. 3. A plurality of reinforcement fibers 3d of the concentrator used, which in each case protrude through the adjacent boundary surface 3a, 3b into the respective adjacent material regions of the thermoplastic plastics material joining partners 10, 20, which are reinforced with endless fibers, and thus contribute toward the strength of the connection, are located in the transition region 3c.

The present exemplary embodiment may be implemented using thermoplastic polyamide which is configured so as to be reinforced with endless fibers. Fiber-reinforced polyamide PA 66 in the form of granulate may be employed as the concentrator 1, for example.

The invention in terms of the implementation thereof is not limited to the preferred exemplary embodiments stated above. Rather, numerous variants which utilize the illustrated solution are contemplated, even if the embodiments are of a fundamentally different type.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for joining fiber-reinforced joining partners formed of a plastics material, the method comprising the acts of:
    applying a concentrator in a region between connection faces of the joining partners; and
    fusing together, via ultrasonic welding, the connection faces such that a materially integral joint is obtained post-curing as a mixing region configured from materials of the joining partners and the concentrator;
    wherein the joining partners are composed of a thermoplastics material into which a plurality of endless fibers are embedded;
    wherein the concentrator comprises a fiber-reinforced plastics material;
    wherein post-curing, the materially integral joint comprises in each case one upper and lower boundary surface, wherein a plurality of reinforcement fibers of the concentrator protrude through the boundary surfaces and into adjacent material regions of the joining partners and contribute toward a strength of the materially integral joint.

2. The method according to claim 1, wherein carbon fibers, carbon-based fibers or glass fibers, respectively, are used as fiber-reinforcements.

3. The method according to claim 1, wherein plastics granulate is used as the concentrator.

4. A method for joining fiber-reinforced joining partners formed of a plastics material, the method comprising the acts of:
    applying an insert in a region between connection faces of the joining partners; and
    fusing, via ultrasonic welding, the connection faces such that the insert is embedded in a materially-integral manner into the connection faces and a form-fitting joint is obtained;
    wherein the joining partners are composed of a thermoplastics material into which a plurality of endless fibers are embedded;
    wherein the insert comprises a fiber-reinforced plastics material;
    wherein post-curing, the form-fitting joint comprises in each case one upper and lower boundary surface, wherein a plurality of reinforcement fibers of the insert protrude through the boundary surfaces and into adjacent material regions of the joining partners and contribute toward a strength of the form-fitting joint.

5. The method according to claim 4, wherein carbon fibers, carbon-based fibers or glass fibers respectively, are used as fiber-reinforcements.

6. The method according to claim 4, wherein a plurality of inserts having various shapes and/or material compositions are embedded into the form-fitting joint.

7. The method according to claim 4, wherein the insert has a melting temperature above a melting temperature of the joining partners.

8. The method according to claim 6, wherein the plurality of inserts have melting temperatures above the melting temperatures of the joining partners.

* * * * *